(12) United States Patent
Lemon (10) Patent No.: US 7,016,953 B2
(45) Date of Patent: Mar. 21, 2006

(54) HTTP TRANSACTION MONITOR

(75) Inventor: Ana H. von Klopp Lemon, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 387 days.

(21) Appl. No.: 09/730,686

(22) Filed: Dec. 6, 2000

(65) Prior Publication Data

US 2002/0103896 A1    Aug. 1, 2002

Related U.S. Application Data

(60) Provisional application No. 60/237,823, filed on Oct. 3, 2000.

(51) Int. Cl.
*G06F 15/173*    (2006.01)

(52) U.S. Cl. .................... 709/224; 709/230; 709/217

(58) Field of Classification Search .............. 709/203, 709/223–225, 216–219; 715/513
See application file for complete search history.

(56) References Cited

U.S. PATENT DOCUMENTS

| | | | | |
|---|---|---|---|---|
| 5,852,717 A | * | 12/1998 | Bhide et al. | 709/203 |
| 6,081,788 A | * | 6/2000 | Appleman et al. | 705/14 |
| 6,256,739 B1 | * | 7/2001 | Skopp et al. | 713/201 |
| 6,317,786 B1 | * | 11/2001 | Yamane et al. | 709/224 |
| 6,340,977 B1 | * | 1/2002 | Lui et al. | 345/709 |
| 6,418,441 B1 | * | 7/2002 | Call | 707/10 |
| 6,675,214 B1 | * | 1/2004 | Stewart et al. | 709/226 |
| 2002/0083217 A1 | * | 6/2002 | Ward et al. | 709/328 |

* cited by examiner

*Primary Examiner*—Krisna Lim
*Assistant Examiner*—Yasin Barqadle
(74) *Attorney, Agent, or Firm*—Osha Liang LLP (57) ABSTRACT

An apparatus for monitoring data flow in a web application includes a data collector which collects data about transactions on a server that hosts components of the web application. The transactions on the server are initiated through an HTTP request from a client. The apparatus further includes a graphical display which displays the collected data.

25 Claims, 7 Drawing Sheets

HTTP TRANSACTION MONITOR

CROSS-REFERENCE TO RELATED APPLICATIONS

This application claims priority from provisional application Ser. No. 60/237,823, filed Oct. 3, 2000.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

GLOSSARY OF TERMS

The following glossary of some terms are helpful in understanding the background discussion and the detailed description of the invention.

API—Application Programming Interface. An interface for application programs and utilities to access the internal services provided by the operating system.

Applet—A Java™ program embedded in a web page and executed in a Java™-enabled web browser.

ASP™—Active Server Pages™. A scripting environment developed by Microsoft Corporation. ASP™ allows HTML, scripts, and ActiveX components to be combined to create dynamic web pages.

Bean—A JavaBeans™ component.

Web Browser—A client application connected to the World Wide Web that requests resources from a Web server, usually for the purpose of displaying them. Examples of browsers are Internet Explorer and Netscape Navigator.

Class—A user-defined data type that defines a collection of objects that share the same characteristics. An object is one instance of the class.

Cookie—A packet of information sent by an HTTP server to a web browser and then sent back by the browser each time the browser accesses that server. Cookies can contain any arbitrary information the server chooses and are used to maintain state between HTTP transactions. Cookies are not visible to the browser user.

DHTML—Dynamic HTML. An extension of HTML, created by Microsoft Corporation. DHTML gives greater control over the layout of page elements and the ability to have web pages which change and interact with the user without having to communicate with the server.

Directory—A simulated file folder on disk.

Execution Server—An HTTP server that includes facilities for executing JSP™ pages and servlets, or dynamic page generation components in general, from within an IDE.

GUI—Graphical User Interface. A graphics-based interface that incorporates icons and/or pull-down menus and user interaction with the GUI.

CGI—Common Gateway Interface. A standard for running external programs from a HTTP server.

CGI Script—A small program written in a script language such as Perl that can be invoked through a request to the web server.

Hook—Programming instructions that provide breakpoints for future expansion. Hooks can be used to call some outside routine or function or may be places where additional processing is added.

HTML—Hypertext Markup Language. A hypertext document format used on the World Wide Web.

HTTP—HyperText Transfer Protocol. The client-server TCP/IP protocol used on the World Wide Web for the exchange of documents.

HTTP Server—A server process running at a web site which sends out web pages in response to HTTP requests from remote browsers.

HTTP Session—Allows the server to maintain state between different HTTP requests. The HTTP server knows which session to associate with the request because the browser sends the session ID as part of the request. This can either be done with a cookie or by adding a parameter to the request URL.

IDE—Integrated Development Environment. An application that facilitates the process of writing software. An IDE typically includes a syntax-based editor, graphical tools for program entry, and integrated support for compiling, running, and debugging the program.

IDE Session—The instance of an application that is created when the application is started. The session ends when the application is exited.

Internal Server—An HTTP server that runs in the same process as an IDE for the purpose of providing services to the IDE.

JavaBeans™—A component software architecture that runs in the Java™ environment, initially developed by Sun Microsystems, Inc. JavaBeans™ allows developers to create reusable components that can be assembled together using a visual application builder tool.

JSP™—JavaServer Pages™. A specification to extend the Java™ Servlet API to generate dynamic web pages on a web server. It includes a set of tags in XML format for creating dynamic content in web pages. In order to use JSP™ on a web server, the web server needs a JSP™ engine and a servlet engine. The JSP™ engine is responsible for generating a servlet from the JSP™ page and maintaining a name convention such that the servlet is invoked when the JSP™ page is processed. JSP™ was developed by Sun Microsystems, Inc.

JSP™ Page—A text-based document that uses fixed template data and JSP™ elements and describes how to process a request to create a response. The template data consists of JSP™ tags embedded in static content which is typically HTML.

Servlet—A Java™ program that runs exclusively in a servlet engine which is an extension to a web server.

XML—Extensible Markup Language.

LRI—Local resource identifier. The location of the resource relative to the hierarchical structure of the server.

URL—Uniform Resource Locator. A compact string representative of resources available via the network. A URL has the form <protocol>://<server name> <LRI> <? optional parameters>.

Process—A self-contained operating environment that behaves as if it is a separate computer. A Java™ virtual machine is a Java™ interpreter that converts Java byte code into machine language one at a time and then executes it.

BACKGROUND OF THE INVENTION

1. Field of the Invention

The invention relates generally to software development process. More specifically, the invention relates to a method and system for test-running and debugging web applications.

2. Background Art

A web application is a web site where users can access the information they need and change the state of application logic on a server through a set of web pages. Web application development is usually centered around tools and technologies. A web application centered around the Java™ technology may comprise the following: JSP™ pages and Java™ servlets that handle HTTP requests and generate dynamic content, server-side beans that encapsulate application behavior and state, static HTML files, DHTML files, image files, sound files, and libraries with additional Java™ components, such as client-side Java™ applets and any Java™ class files used by the other Java™ components. The J2EE™ specification describes a standard for how to organize such files into web modules, including describing how they are accessed. Web modules could be developed in an IDE, such as sold under the trade name Forte™ for Java™ by Sun Microsystems, Inc.

The task of debugging web applications such as described above is in some ways very different from standalone executables. A common approach to identifying bugs in standalone programs is source level debugging. Source level debugging essentially involves following the execution of a program by stepping through the source code line by line. At each step of the debugging process, the program's internal variables are accessed and examined to isolate the source of the bug. While this approach is useful for debugging standalone programs, it is often too fine-grained for web applications for two reasons. One of the reasons is that the behavior of the components that make up a web application, at least the components that handle the HTTP transactions, are typically very simple in comparison to the components of the standalone program. The other reason is that the components of the web application are managed by the web server, not by the web application itself. This means that data flow between the components is managed at the level of the web server.

In the Java™-centered web application described above, the components that enable dynamic content generation include the JSP™ pages and Java™ servlets. The following is a listing of a sample JSP™ page that sets a new attribute and generates a response page which displays the attribute the user is trying to set and the attributes that are currently set.

---

Sample Listing of a JSP ™ Page

---

```
<%@page contentType ="text/html"%>
<html>
<head> <title>Output Page</title> </head>
<body>
<h1>Output page</h1>
<p>You added the following attribute to the session:
<table>
<tr> <td> <b>Attribute:</b> </td>
    <td> <%=request.getParameter("att")%> </td>
    <td> <b>Value</b> </td>
    <td> <%=request.getParameter("val")%> </td>
</tr> </table>
<%
session.Attribute ((String) request.getParameter("att"),
request.getParameter("val"));
%>
<p>Current attributes in the session:
<table>
<tr> <td> <b>Attribute</b> </td> <td> <b>Name</b> </td> </tr>
<%
```

---

-continued

Sample Listing of a JSP ™ Page

---

```
java.util.Enumeration e = session.getAttributeNames ( );
while e.hasMoreElements ( )) {
    String name = (String)e.nextElement( );
    String value = (String)session.getAttribute(name);
    out.println("<tr> <td>" + name + "</td> <td>" +
    value + "</td> </tr>");
}
%>
</table>
</body>
</html>
```

---

The code excerpt above is fairly representative of the level of complexity in JSP™ pages. A JSP™ page can involve complex processing, but the code that performs the complex processing is typically encapsulated in a bean or in a JSP™ tag, leaving the source of the page itself relatively simple. In many cases, bugs in JSP™ pages can be easily identified by visual inspection of the code. The same is true for servlets. In practice, many of the bugs in JSP™ pages and servlets, or for that matter any dynamic page generation components, arise because of incorrect data flow between the components of the web application. For this reason, source level debugging is too fine grained a process as a first option for debugging JSP™ pages and servlets. If the user has access to the parameter values and other data used by the JSP™ page or servlet, they can often identify the source of the problem much quicker than if they have to go through the overhead of starting a debugger and stepping through the code.

The data passed into the JSP™ page is not easily available to the developer. The data comes from different sources such as the parameters passed in with the HTTP request, cookies, session variables, and HTTP headers. These sources are all managed at the level of the HTTP server as opposed to by the JSP™ page itself, and the HTTP server usually does not provide an easy way of tracking the data. While HTTP request parameters may be shown in the browser's location window for HTTP "get" requests, nothing is shown for HTTP "post" requests, and cookies and session variables are typically not logged by either the server or the browser. Likewise, there is usually no easy way to display the HTTP headers sent by the client.

In order to be able to test-run and debug the web application efficiently, a mechanism is needed which will allow data flow between the components of the web application to be monitored. If the data flow between the components of the web application can be followed, then the component not behaving correctly can be identified. Even where the problem is not incorrect data flow, monitoring data flow can help quickly determine where the problem arises. Once the component during whose execution the problem arises has been identified, the source of the bug can be isolated. The bug may be in the JSP™ page or servlet itself or in a component which the JSP™ page or servlet invokes. As pointed out above, bugs in the JSP™ page or servlet are often obvious from code inspection. Source level debugging may be needed if the bugs are in components invoked by the JSP™ page or servlet.

SUMMARY OF THE INVENTION

In one aspect, the invention relates to an apparatus for monitoring data flow in a web application. The apparatus comprises a data collector which collects data about transactions on a server that hosts components of the web application. The transactions are initiated through an HTTP request from a client. The apparatus further includes a graphical display that displays the collected data. In one embodiment, the data collector comprises a process which uses hooks in the server to intercept the transactions in order to collect data about them. In another embodiment, the data collector comprises a process which uses hooks in a server plug-in application that handles the dynamic components of the web application to intercept the transactions in order to collect data about them. In some embodiments, the data collected by the data collector is selected from the group consisting of attributes of incoming request to and outgoing response from the server, attributes of incoming cookies to and outgoing cookies from the server, status of HTTP session between the server and the client before and after transactions are processed, and attributes of the client.

In another aspect, the invention relates to a method for monitoring data flow in a web application. The method comprises sending a request to a server that hosts components of the web application. Prior to the server processing the request, the method includes intercepting the request to collect data about the request. The method further includes receiving a response from the server. Prior to the server sending the response, the method includes intercepting the response to collect data about the response. The method further includes displaying the collected data in a graphical display.

Other aspects and advantages of the invention will be apparent from the following description and the appended claims.

DETAILED DESCRIPTION OF THE INVENTION

Embodiments of the invention provide a mechanism for monitoring data flow between the components of a web application during testing and debugging of the web application. Generally speaking, the mechanism comprises a client-side component that may or may not be integrated with an IDE and a server-side component that runs as part of an execution server which could be started by the IDE. For each HTTP transaction, the server-side component records data about the incoming request, about the data states maintained on the server, and about the environments of the servlet or JSP™ that processes the request if there is one. The client-side component lists all HTTP transactions currently handled by the test server and any transactions that have been explicitly saved by the user. Current transactions are kept for the duration of the IDE session. The invention also provides a facility for saving transactions so that the transactions can be explored at a later time.

In the detailed description of the invention which follows, a web application which contains JSPs™ and servlets is used in illustrating the principles of the invention. However, it would be understood by one of ordinary skill in the art that the principles of the invention are applicable to web applications containing other types of dynamic page generation components such as ASPs™ and CGI scripts. Also, for convenience, the following detailed description is outlined into five principal sections, including Architecture overview, Directory Structure, HTTP Transaction Monitor GUI, HTTP Transaction Monitor Server-Side Functionality, and Operation.

Architecture Overview

Figure 1:
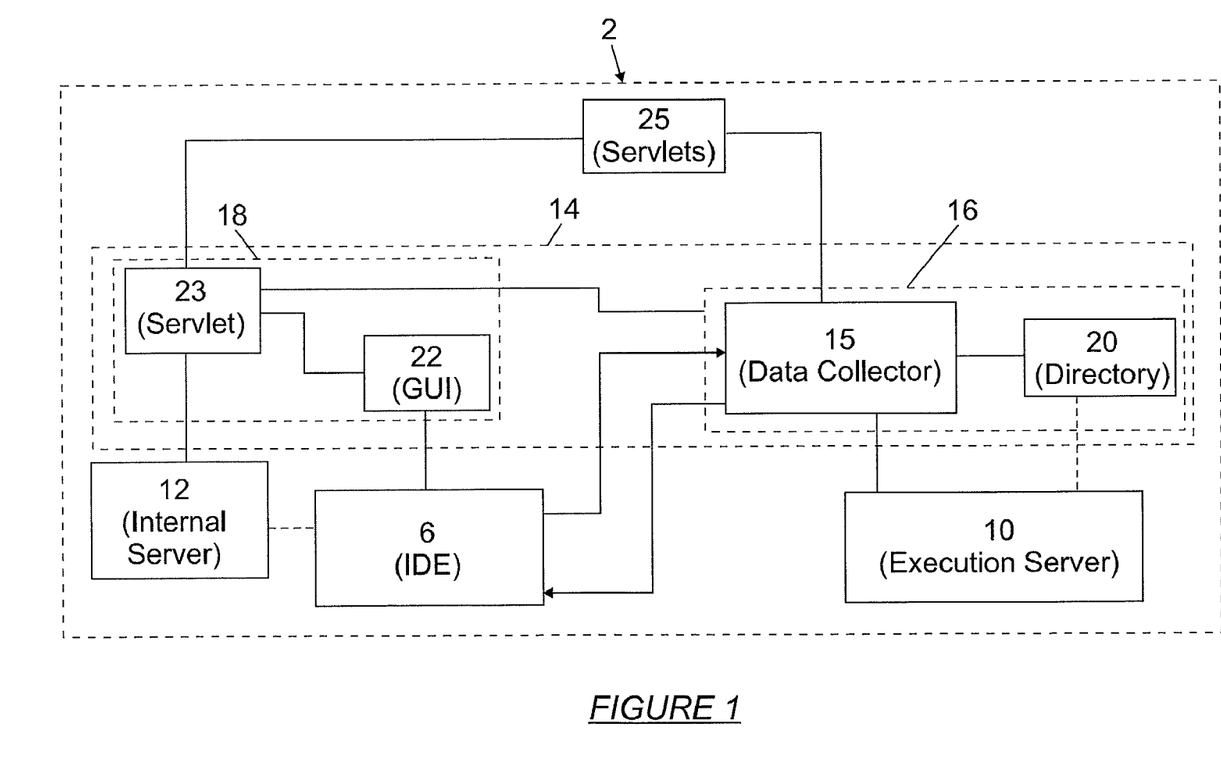
FIG. 1 is a block diagram of an application development environment incorporating a HTTP transaction monitor according to one embodiment of the invention.

FIG. 1 shows a block diagram of a testing/debugging system 2 which includes an embodiment of the invention. The testing/debugging system 2 includes an IDE 6 which can be used to design, compile, execute, test, and debug components of a web application. In one embodiment, the IDE 6 is a Java™ application which consists of byte codes that are interpreted by a Java™ virtual machine (not shown). However, the IDE 6 may be written in other programming languages, e.g., C++. When the IDE 6 is started, a GUI (not shown) is displayed through which a developer can develop and/or view the components of the web application. Further, the IDE 6 can execute the web application components in an HTTP server that is running in a separate process. This HTTP server will be referred to as the execution server 10. The execution server 10 may be started, for example, when a user selects a file representation of a JSP™ page (not shown) from the IDE 6. The execution server 10 may be on the same host machine as the IDE 6 or may be on a different host machine. The IDE 6 includes a mechanism through which a data collector 15 can notify the IDE 6 of transactions processed by the execution server 10. In one embodiment, this is an HTTP server, herein referred to as internal server 12, which is built into the IDE 6 and is configurable from the IDE 6.

An HTTP transaction monitor 14 includes a server-side component 16 that collects data about HTTP transactions on the execution server 10 and a client-side component 18 that displays the collected data. The HTTP transactions can either be initiated by the IDE 6 or through an external HTTP client, e.g., a browser, pointed to the host and port of the execution server 10. The server-side component 16 comprises the data collector 15 which is responsible for collecting data before and after the execution server 10 processes the HTTP requests. In one implementation, the data collector 15 runs on the execution server 10 and relies on hooks in the execution server 10 to intercept HTTP requests in order to collect data about them. In an alternate embodiment, the data collector 15 uses hooks in a server plug-in application that handles the dynamic components of the web application, e.g., a servlet engine, to intercept HTTP requests in order to collect data about them. The collected data is written to files in a directory 20.

The client-side component 18 is accessible through the IDE 6. The client-side component 18 includes a GUI 22 that displays the transactions for which the server-side component 16 has collected data. The client-side component 18 further includes a mechanism for receiving notification of new HTTP transactions, which are subsequently listed on the GUI 22. In one embodiment, this functionality is handled by a servlet 23 which runs on the internal server 12 and is called whenever the server-side component 16 records a new transaction.

Directory Structure

In one implementation, the directory 20 is treated as part of the server-side component 16 and is installed as a web module on the execution server 10. In alternative embodiments, the directory 20 may maintained by the client-side component 18. The contents of the directory 20 include the following:

- A directory "current" which contains a subdirectory for each transaction that has been recorded in the current IDE session and which has not been saved.
- A directory "save" which contains a subdirectory for each transaction that has been saved.

There could be other ways of keeping track of whether the transactions are current or saved. The current transactions are deleted either when the IDE session is ended or when it starts.

In one implementation, the directory 20 contains a list of servlets which are invoked by the client-side component 18. The servlets, indicated collectively at 25, perform the following functions:

- serve up data from the files stored in the "current" and "save" subdirectories,
- delete records corresponding to one or more transactions,
- move records from the "current" subdirectory to the "save" subdirectory, and
- serve up a list of all current and saved transactions.

The servlets 25 may run on the execution server 10 or on the internal server 12.

HTTP Transaction Monitor GUI

Figure 2:
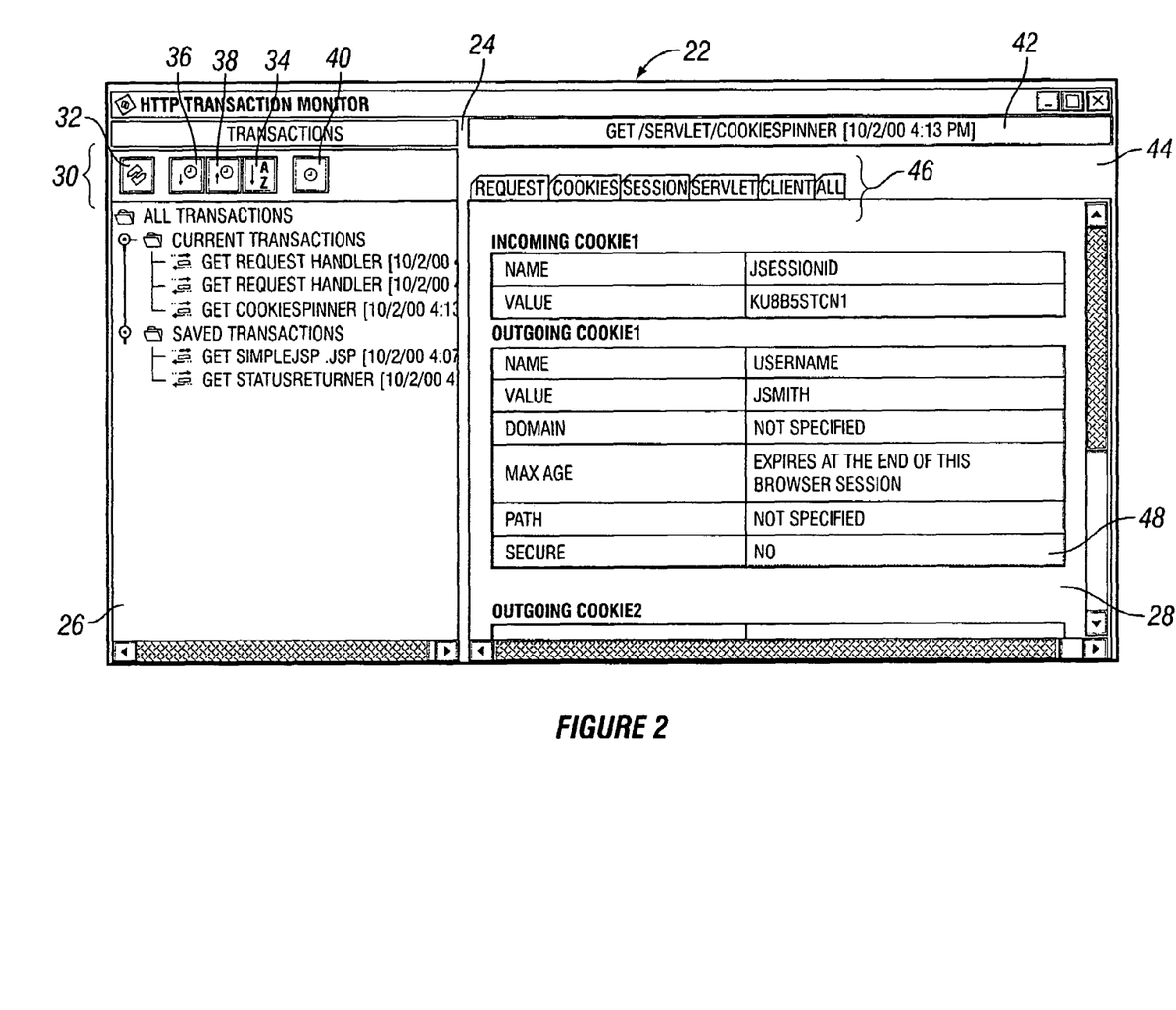
FIG. 2 shows a GUI for the HTTP transaction monitor in accordance with one embodiment of the invention.
Figure 3:
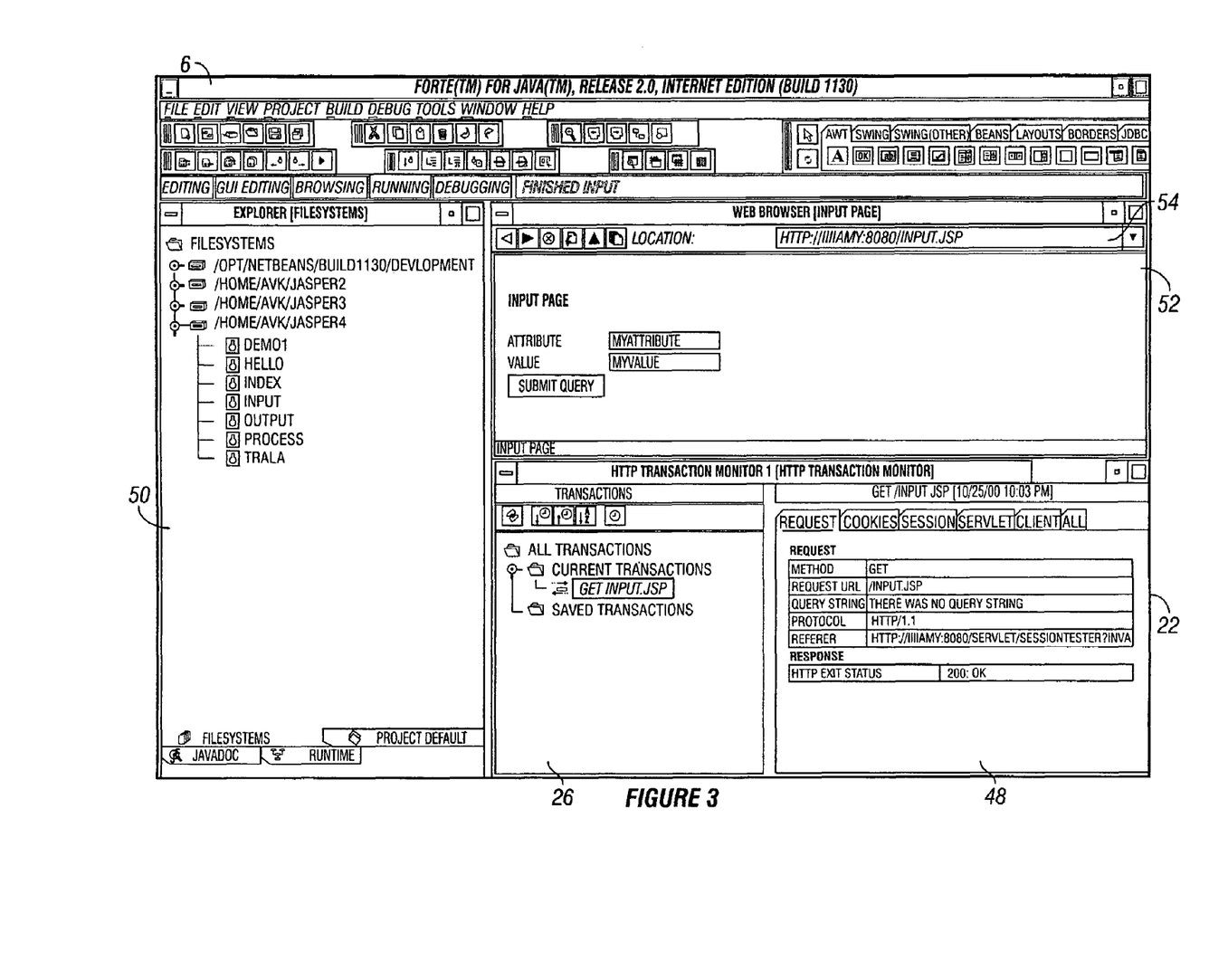
FIG. 3 shows the GUI of FIG. 2 integrated with an IDE and an input page displayed in a browser in the IDE.
Figure 4:
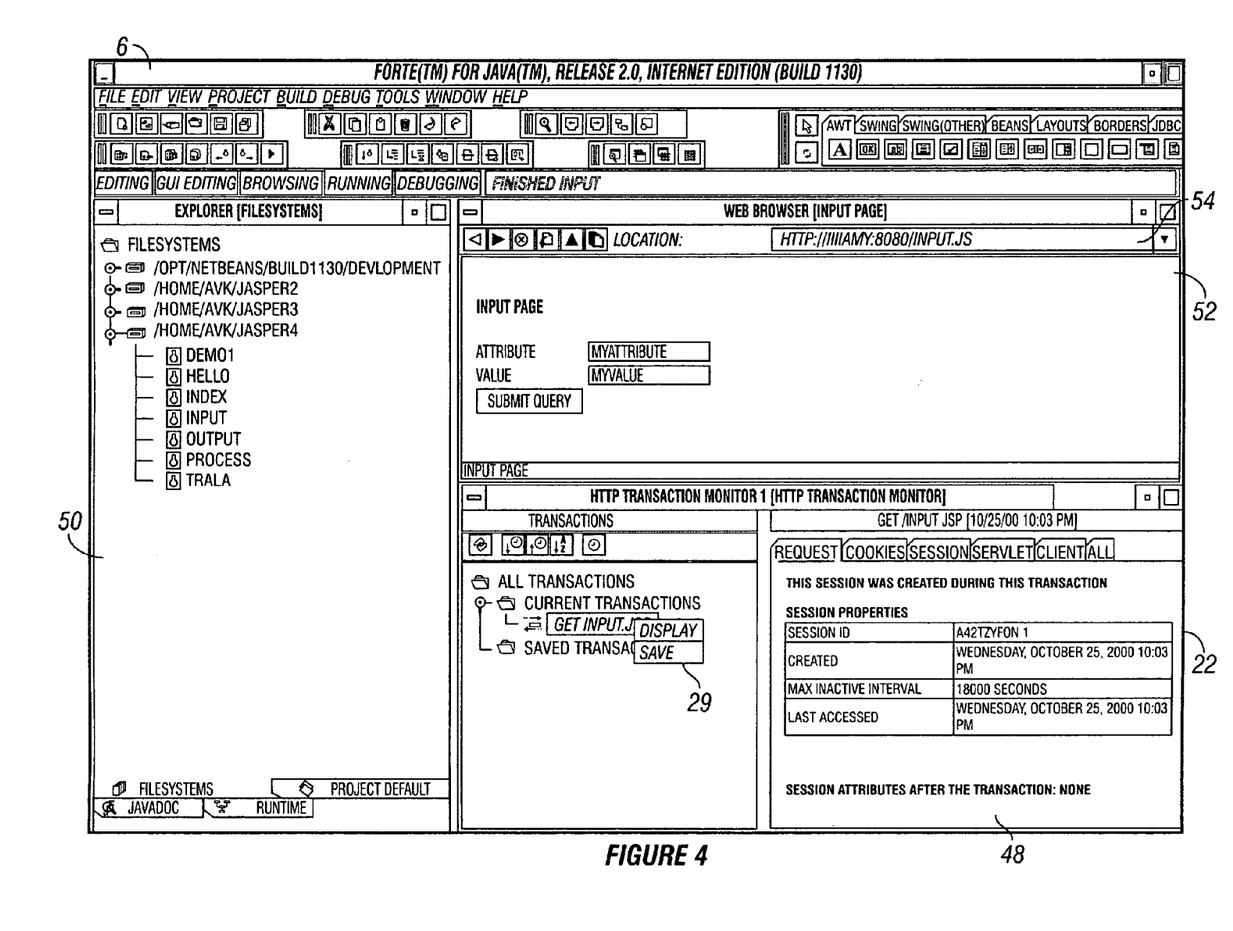
FIG. 4 shows the GUI displaying data about the transaction used to get the input page shown in FIG. 3.

FIGS. 2–4 show one embodiment of the GUI 22 (previously shown in FIG. 1). In one implementation, the GUI 22 is a software component that can be called from within the IDE 6. In the illustrated embodiment, the GUI 22 comprises a single frame 24 made up of a left pane 26 and a right pane 28. The GUI 22 displays a list of HTTP transactions on the left pane 26 and data for an individual transaction on the right pane 28. The left pane 26 of the GUI 22 displays one supercategory node "All Transactions." Under the supercategory "All Transactions" are subcategory nodes "Current Transactions" and "Saved Transactions." Individual transactions are leaf nodes and reside in either the "Current Transactions" subcategory or the "Saved Transactions" subcategory.

Entries in the "Current Transactions" subcategory are available during the current IDE session, while entries in the "Saved Transactions" subcategory persist until they are deleted by the user. The entries in the "Current Transactions" and "Saved Transactions" subcategories are obtained from the "current" and "save" subdirectories in the directory 20 (shown in FIG. 1).

Individual transaction nodes in the "Current Transactions" subcategory have two actions: "Display" and "Save." In the "Saved Transactions" subcategory, the individual transactions have "Display" and "Delete" actions. The "Display" action causes data about the corresponding transaction to be shown in the right pane 28. The data can also be displayed simply by selecting the node. In one implementation, the "Save" action sends a message to the execution server 10 (shown in FIG. 1) to mark the corresponding transaction records as saved. This assumes that the directory 20 (shown in FIG. 1) is installed as a web module on the execution server. If the directory 20 (shown in FIG. 1) is maintained by the client-component 18 (shown in FIG. 1), the "Save" action causes the client-component 18 itself to perform this task. Similarly, the "Delete" action causes the records for the corresponding transactions to be deleted and removes the node from the GUI 22. In one implementation, the list of actions available under each transaction category is displayed in a pop-up menu (29 in FIG. 4) when the user clicks on a transaction.

Each of the nodes corresponding to the parent categories "All Transactions," "Current Transactions," and "Save Transactions" have a "Delete" action which causes the individual transactions underneath them to be deleted. Invoking the "Delete" action on the "All Transactions" category deletes all transaction entries and removes all nodes from the GUI 22. Invoking "Delete" action on "Saved Transactions" deletes all saved transactions and removes the node in the "Saved Transactions" category. Invoking "Delete" action on "Current Transactions" deletes all current transactions and removes the node in the "Current Transactions" category. A row of buttons 30 above the transaction list allows the user to reload all transactions and to modify display parameters. The button 32 reloads all the transactions. The button 34 displays the transactions in alphabetical order, by LRI. The button 36 displays the transactions in temporal order, last transaction last. The button 38 displays the transactions in reverse temporal order, last transaction first. The button 40 toggles whether the time stamp of the transaction is shown or not.

The right pane 28 of the frame 24 includes a label 42 which displays the LRI and timestamp of the currently selected transaction. The right pane 28 also includes a display component 44 consisting of six tabs 46 and data display 48. In one embodiment, the data display 48 is an embedded HTML browser without toolbar and controls. The six tabs 46 are labeled "Request," "Cookies," "Session," "Servlet," "Client," and "All," respectively. The "Request," "Cookies," "Session," "Servlet," and "Client," tabs correspond to the five categories of data collected by the server-side component 16 and will be further described in the next section. In FIG. 2, the "Cookies" tab is selected, causing the attributes of incoming and outgoing cookies for the transaction selected on the left pane 26 to be displayed inside the data display 48. When the "Session" tab is selected, the session status before and after the transaction selected on the left pane 26 is displayed inside the data display 48. When the "Request" tab is selected, properties of the request and response associated with the transaction selected on the left pane 26 is displayed inside the data display 48. The "Servlet" and "Client" tabs cause servlet properties data and client data, respectively, to be displayed in the data display 48 for a selected transaction. The "All" tab causes the all transaction data to be displayed at once in the data display 48.

FIG. 3 shows the GUI 22 invoked from within an IDE 6, e.g., the Forte™ for Java™ IDE from Sun Microsystems, Inc. The Internet Edition of the Forte™ for Java™ IDE includes two modules which assist in designing, debugging, executing, and debugging JSP™ pages and servlets. However, it should be clear that the invention is not limited to this particular IDE or for that matter to any IDE. It could be used as a standalone tool with a web server. The invention is also not limited to support development of JSP™ pages and servlets. In general, the invention can be applied to any development of web applications. In the illustrated embodiment, the user can invoke the GUI 22 by selecting the appropriate option in the "Debug" menu of the IDE 6 or by setting the JSP™/servlet executor property "Show Monitor" to True. The latter method causes the GUI 22 to be displayed every time the JSP™/servlet executor (not shown) is invoked. The former displays the GUI 22 during the IDE session or until it is closed by the user. The IDE session is the period during which the user runs one instance of the IDE 6. The IDE session starts when the user brings up the IDE 6 and ends when the user exits the IDE 6.

HTTP Transaction Monitor Server-Side Functionality

Referring to FIG. 1, for each HTTP transaction that the execution server 10 processes, a new directory is created under the subdirectory "current" in the directory 20. The name of the new directory uniquely identifies the HTTP request. Five categories of data are collected and saved in five files. The categories of data collected are specified in Table 1 below.

TABLE 1

Types of Data Collected by Server-Side Component

| Category | Type of Data Collected |
|---|---|
| Request | The HTTP method, the LRI, path information (if appropriate), the query string, the protocol version, the referrer (if appropriate), the value of any incoming parameters, and the exit status of the HTTP response. (See FIG. 4) |
| Cookies | List of incoming and outgoing cookies. For incoming cookies, the name and value is provided. For outgoing cookies, the name, value, domain time to live, path and whether the cookie requires secure protocol. (See FIG. 2) |
| Session | Whether the session exists before and after the transaction. Which attributes were set and what their values are before and after the transaction. The session's properties: its ID, when it was created, its maximum inactive interval, and when it was last accessed. (See FIG. 3) |
| Servlet Properties | Name of the servlet as configured, its class name, its package name, the description given by the developer, and the relative path to the servlet. The servlet's initialization parameters, if there are any. The absolute path to the J2EE ™ context. The servlet engine's properties (Java Development Kit and platform). |
| Client | The version of the HTTP protocol, the client's IP address, any other information provided through the HTTP headers such as the nature of the client (e.g., the type and version of the browser). |

In addition to the five categories of data collected, an entry for the transaction is made in a "log" file stored in the transaction's directory. The entries made in the "log" file contain the data required to create a node for the transaction in the GUI 22 (shown in FIG. 2). In one embodiment, this includes the ID of the transaction, the HTTP method, the LRI of the request, and timestamp of the transaction. Other types of data may be recorded in the "log" file for more advanced GUI. The HTTP request can be marked as saved by moving its directory to the directory "save." Marking a transaction as saved causes it to become persistent between IDE sessions until explicitly deleted by the user.

The data collector 15 intercepts HTTP requests before and after the execution server 10 processes them to collect the data. For the Tomcat web server, for example, a single instance of the "RequestInterceptor" API can be used to collect data. The Tomcat web server is an open-source software project jointly run by Apache Software Foundation and Sun Microsystems, Inc. The "RequestInterceptor" API provides hooks for invoking methods before and after the HTTP request is processed. Before processing the HTTP request, the HTTP request is intercepted on the execution server 10 in order to collect data about the client, the session state before the transaction, incoming cookies, servlet properties data, and all the request data except the exit status (see Table 1 above). Before sending the HTTP response corresponding to the HTTP request to the client, the HTTP response is intercepted on the execution server 10 in order to collect data about outgoing cookies, the session state after the transaction, and the exit status. After collecting data, the data collector 15 notifies the servlet 23 that a new transaction has been recorded in the directory 20. The servlet 23 then calls the appropriate one of the servlets 25 to get the data to create the new transaction node in the GUI 22. In another embodiment, the "Filter" API, as described in the version 2.3 of the Java™ Servlet specification, can be used for the same purpose as the "RequestInterceptor" API.

Operation

The testing of a web application involves among other tasks verifying that each dynamic web component, e.g., JSP™ page or servlet in the case of a Java web application, generates the appropriate result for all possible input. This involves testing individual web components and also sequences of components as they would be traversed by a user who browses the web site. In the discussion which follows, the web application to be tested has been developed in an IDE, for example, the IDE 6 (shown in FIG. 1). The IDE 6 (shown in FIG. 1) must be running to test-run and debug the web application. The developer can execute the JSP™ pages or servlets from the IDE. The HTTP transaction monitor GUI 22 is displayed by either one of two previously described mechanisms. As shown in FIG. 3, the contents of a web application is displayed in an Explorer GUI 50 that is included in the IDE 6. The developer selects a page in the web application and then asks the IDE 6 to display the page. For example, in FIG. 3, a JSP™ page called "input" has been selected. To display the page, the IDE 6 sends an HTTP request to the execution server 10 (shown in FIG. 1). The output of the execution server 10 (shown in FIG. 1), i.e., the HTTP response, is displayed in the browser 52 which is included in the IDE 6.

Before the execution server 10 (shown in FIG. 1) processes any incoming HTTP request, the data collector 15 (shown in FIG. 1) intercepts the request and collects data about the request. After collecting the data, control is returned to the execution server 10 (shown in FIG. 1), and the execution server 10 (shown in FIG. 1) processes the request. The execution server 10 (shown in FIG. 1) invokes a servlet (not shown) generated from the JSP™ page with the data that came in with the HTTP request. After processing, the execution server 10 (shown in FIG. 1) sends the response page back to the browser 52. Before the response page is sent to the browser 52, the data collector 15 (shown in FIG. 1) again intercepts the response, collects data on the response, and then yields control back to the execution server 10 (shown in FIG. 1). After collecting data, the data collector 15 (shown in FIG. 1) invokes the servlet 23 (shown in FIG. 1) to update the GUI 22. As shown, a "Get inputjsp" node has been added to "Current Transactions" subcategory on the left pane 26 of the GUI 22. The browser 48 displays the "request" data collected by the data collector 15 for the "Get inputjsp" transaction. In FIG. 4, the "session" data collected by the data collector 15 for the "Get inputjsp" transaction is displayed in the browser 48. A pop-up menu 29 is also shown which allows the data associated with the "Get inputjsp" node to be saved for future use.

For illustrative purposes, assume that the "inputjsp" page includes a form with input fields for user input. A sample listing of such a page is shown below, and the rendering of the page is shown in the browser 52 in FIGS. 3 and 4.

---
Listing of input.jsp
---
```
<%@page contentType ="text/html"%>
<html>
<head>
<title>Input Page</title>
</head>
<body>
<h1>Input page</h1>
<form method="POST" action="output.jsp">
<table>
<tr> <td>Attribute</td>
    <td> <input type=text size=12 name="att"> </td> </tr>
<tr> <td>Value</td>
    <td> <input type=text size=12 name="val"> </td> </tr>
<tr> <td> <input type="submit" name="Submit Query"> </td>
    <td> </td> </tr>
</table>
</form>
</body>
</html>
```
---

The "input" page has two input fields, one for an attribute and the other for a value. To test the "input" page, the developer fills out the form and submits the form by clicking on the "Submit Query" button. When the user clicks on the "Submit Query" button, the data is sent to a JSP™ page called "outputjsp" in a HTTP "post" request. The following is a sample listing of the "outputjsp" page.

---
Listing of output.jsp
---
```
<% @page contentType="text/html"%>
<html>
<head>
<title>Output Page</title>
</head>
<body>
<h1>Output page</h1>
<p>You added the following attribute to the session:
<table>
```
---

---
Listing of output.jsp
---
```
<tr> <td> <b>Attribute:</b> </td>
    <td> <%=request.getParameter("att")%> </td>
    <td> <b>Value</b> </td>
    <td> <%=request.getParameter("val")%> </td> </tr>
</table>
<%
session.Attribute((String) request.getParameter("att"),
request.getParameter("val"));
%>
<p>Current attributes in the session:
<table>
<tr> <td> <b>Attribute</b> </td> <td> <b>Name</b> </td> </tr>
<%
```
---

---
Listing of output.jsp
---
```
java.util.Enumeration e = session.getAttributeNames ( );
while e.hasMoreElements( )) {
    String name = (String)e.nextElement( );
    String value = (String)session.getAttribute(name);
    out.println("<tr> <td>" + name + "</td> <td>" +
        value + "</td> </tr>");
}
%>
</table>
</body>
</html>
```
---

Figure 5:
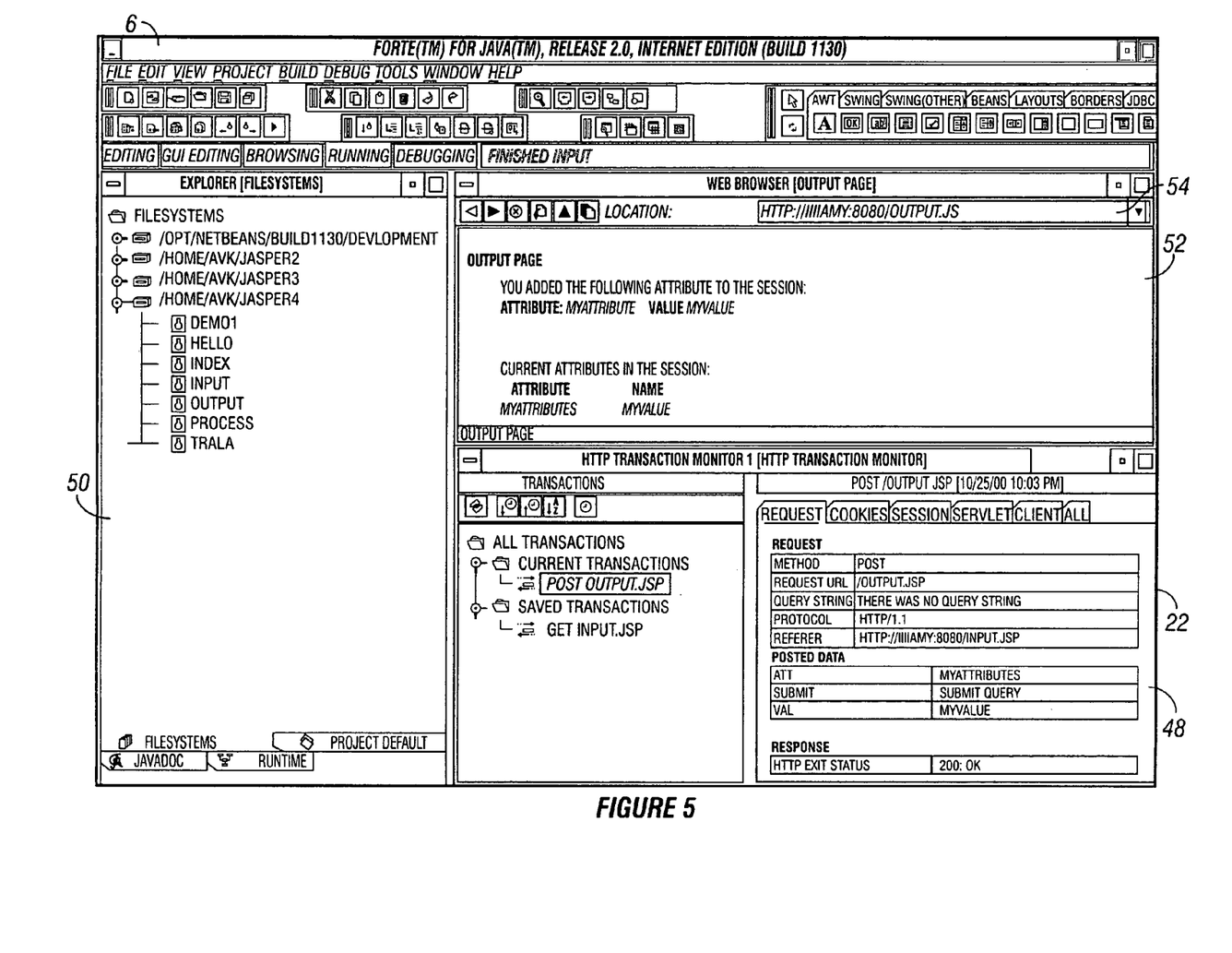
FIG. 5 shows a response page generated when a button is clicked on the input page shown in FIG. 3.

The "outputjsp" page sets the new attribute and generates a response page which displays what attribute the user is trying to set and then which attributes are currently set. FIG. 5 shows the response page generated by the "outputjsp" page in the browser 52.

With a "post" request, the data transmitted to the execution server 10 is not shown as part of the URL in the browser 52, i.e., no parameters are appended to the URL. The URL is displayed in the location window 54 of the browser 52. Before the execution server 10 (shown in FIG. 1) processes the "post" request, the data collector 15 (shown in FIG. 1) intercepts the request and collects data about the request. After collecting the data, control is returned to the execution server 10 (shown in FIG. 1), and the execution server 10 (shown in FIG. 1) processes the request to generate the response page shown in FIG. 5. Before the execution server 10 (shown in FIG. 1) sends the response page to the browser 52, the data collector 15 again collects data about the response. The data collected by the data collector 15 (shown in FIG. 1) is added as a "POST outputjsp" node to the "Current Transactions" subcategory on the left pane 26 of the GUI 22. Note that the "Get inputjsp" node has been moved to the "Saved Transactions" subcategory by invoking the "Save" action (see FIG. 4).

Figure 6:
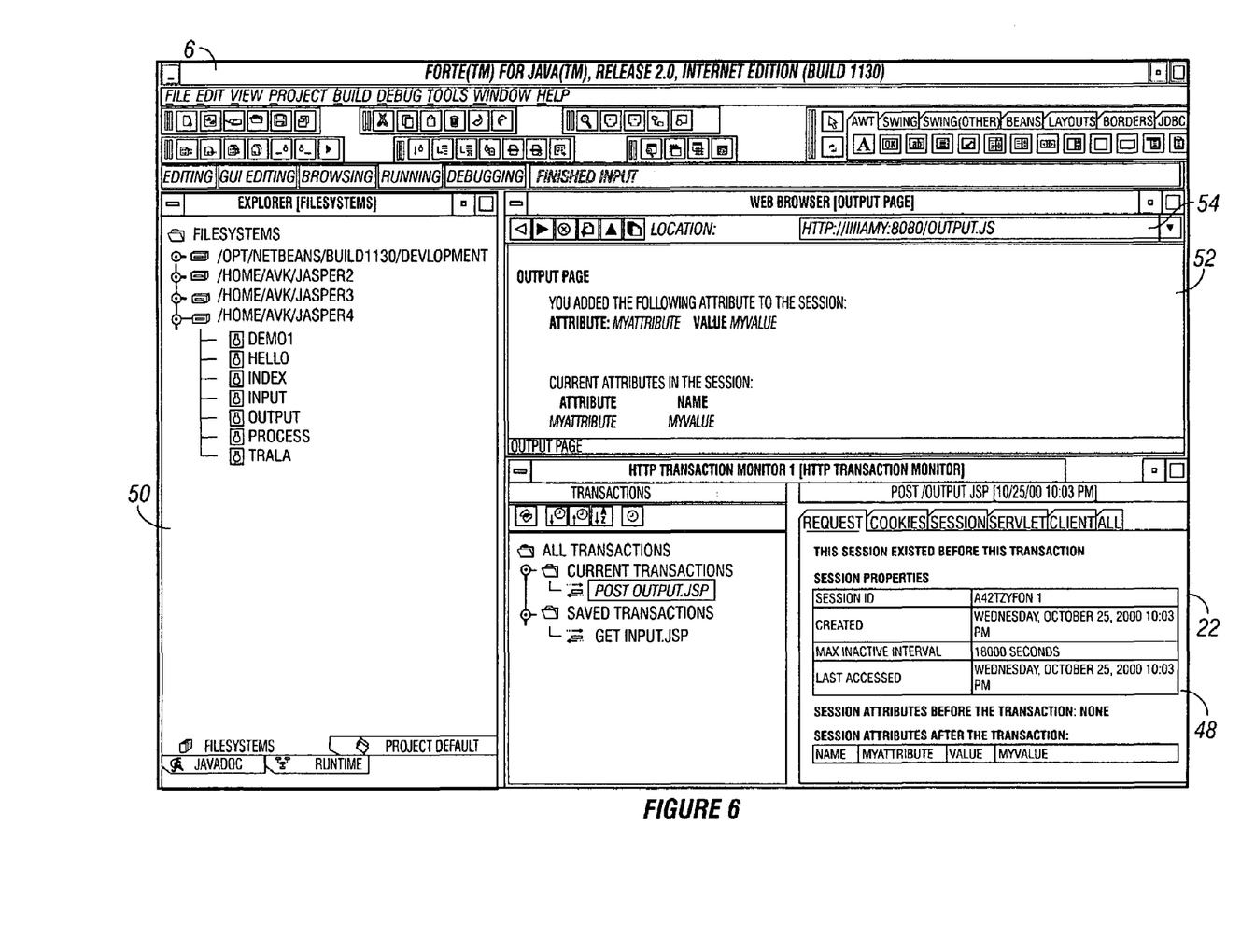
FIGS. 6 and 7 show the GUI displaying data about the transaction used to generate the response page shown in FIG. 5.
Figure 7:
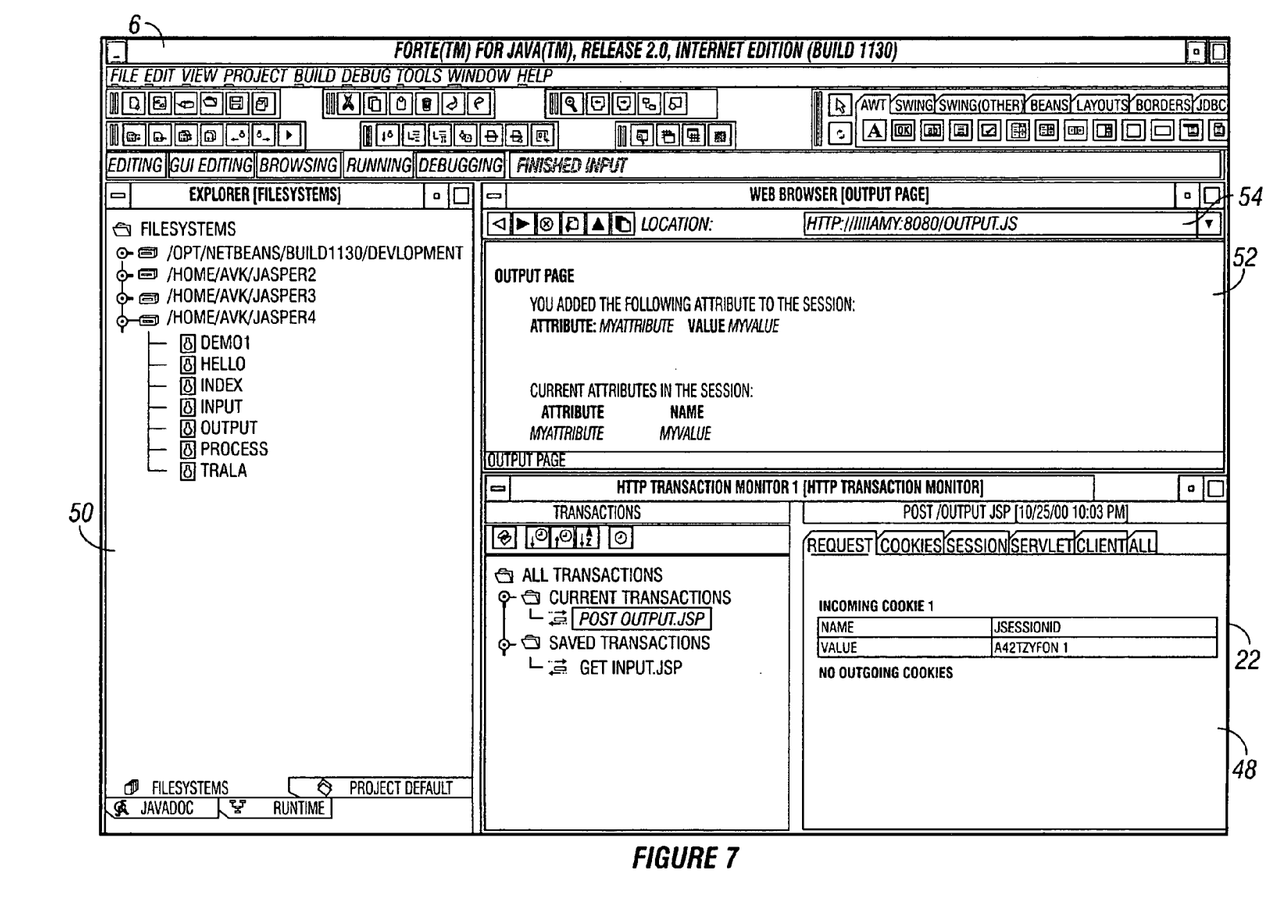

FIG. 5 shows the "request" data associated with the "POST output jsp" transaction in the browser 48 of the GUI 22. Note that the posted data is shown in the browser 48. Thus the developer now has direct access to the posted data through the GUI 22. FIG. 6 shows the "session" data associated with the "POST outputjsp" node in the browser 48 of the GUI 22. Note that the "session" data has changed from what was shown in FIG. 4. The session properties are the same, but after "output jsp" has been processed, it now contains an attribute set by the JSPTM. FIG. 7 shows the "cookies" data associated with the "POST outputjsp" node in the browser 48 of the GUI 22. Because the "outputjsp" page didn't generate any cookies, the message "no outgoing cookies" is displayed in the browser 48. The incoming cookie shown in the browser 48 was created when the "input.jsp" page was processed. The purpose of that cookie is to keep track of the client's session. The browser 52 will keep sending this cookie back to the execution server 10. This is how the execution server keeps track of which session belongs to a particular user.

The invention provides general advantages. Using the data collected by the data collector 15, the developer can examine the attributes of incoming requests and outgoing responses on the execution server 10 through the GUI 22, thus allowing data flow in the web application to be monitored. If a problem arises, the developer can easily find the source of the problem by examining the transactions between the browser and the server. The problematic transactions can be saved, for example, by clicking on them and choosing the "save" action. The developer then has the opportunity to return at a later time to examine the transactions. The invention is not limited to IDE's but can be used in web application testing/debugging tools in the same manner described above. Testing tools will typically not provide the facility to fix the problem in real-time, but the problem can be noted and then sent to the developer who will fix them.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for monitoring data flow in a web application hosted on a server, comprising:
    a data collector configured to:
        collect information about a HTTP request when a first hook is triggered in the server while the server is servicing the HTTP request and to return control to the server once information about the HTTP request has been collected, and
        collect information about a HTTP response generated by the server in response to the HTTP request when a second hook in the server is triggered while servicing the HTTP request and to return control to the server once information about the HTTP response has been collected; and
    a graphical display which displays the information about the HTTP request and information about the HTTP response
    wherein each of the first hook and the second hook is embedded in at least one selected from the group consisting of the server and a server plug-in application configured to execute on the server,
    wherein the server is configured to process the HTTP request to generate the HTTP response, and
    wherein the first hook is triggered in at least one selected from the group consisting of the server and the server plug-in application prior to generating the HTTP response and the second hook is triggered in at least one selected from the group consisting of the server and the server plug-in after generating the HTTP response.

2. The system of claim 1, wherein the information about the HTTP request and the information about the HTTP response further comprises one selected from the group consisting of data contained in the HTTP request, data contained in the HTTP response, properties of a dynamic component invoked by the server to process the HTTP request, data contained in a cookie associated with the HTTP request, data contained in a cookie associated with the HTTP response, and combinations thereof.

3. The system of claim 2, wherein the information about the HTTP request further comprises properties of a HTTP session associated with the HTTP request.

4. The system of claim 1, further comprising a directory for storing the information about the HTTP request and the information about the HTTP response on a per-transaction basis.

5. The system of claim 4, further comprising means for retrieving the information about the HTTP request and the information about the HTTP response stored in the directory and for updating the graphical display with the information about the HTTP request and the information about the HTTP response.

6. The system of claim 5, further comprising means for deleting the information about the HTTP request and the information about the HTTP response associated with a selected HTTP request from the directory.

7. A system for monitoring data flow in a web application, comprising:
    a server which hosts the web application servicing a HTTP request from a client, wherein servicing the HTTP request triggers a first hook and a second hook, wherein each of the first hook and the second hook is embedded in at least one selected from the group consisting of the server and a server plug-in application configured to execute on the server, and wherein servicing the HTTP request comprises processing the HTTP request by the server to generate a HTTP response;
    a data collector configured to:
        collect information about the HTTP request when the first hook is triggered and to return control to the server once the information about the HTTP request has been collected, and
        collect information about the HTTP response generated by the server in response to the HTTP request when a second hook is triggered and to return control to the server once the information about the HTTP response has been collected; and
    an application that provides a graphical display for displaying the information about the HTTP request and the information about the HTTP response,
    wherein the first hook is triggered in at least one selected from the group consisting of the server and the server plug-in application prior to generating the HTTP response and the second hook is triggered in at least one selected from the group consisting of the server and the server plug-in after generating the HTTP response.

8. The system of claim 7, wherein the information about the HTTP request and the information about the HTTP response further comprises one selected from the group consisting of data contained in the HTTP request, data contained in the HTTP response, properties of a dynamic component invoked by the server to process the HIP request, data contained in a cookie associated with the HTTP request, data contained in a cookie associated with the HTTP response, and combinations thereof.

9. The system of claim 8, wherein the information about the HTTP request further comprises properties of a HTTP session associated with the HTTP request.

10. A system for test-running and debugging a web application, comprising:
    a server which hosts the web application servicing a HTTP request from a client, wherein servicing the HTTP request triggers a first hook and a second hook, wherein each of the first hook and the second hook are embedded in at least one selected from the group consisting of the server and a server plug-in application configured to execute on the server, and wherein servicing the HTTP request comprises processing the HTTP request by the server to generate a HTTP response;
    the client configured to send the HTTP requesting to the server;
    a data collector configured to:

collect information about the HTTP request when the first hook is triggered and to return control to the server once the information about the HTTP request has been collected, and collect information about the HTTP response generated by the server in response to the HTTP request when a second hook is triggered and to return control to the server once the information about the HTTP response has been collected; and an application that provides a graphical display for displaying the information about the HTTP request and the information about the HTTP response, wherein the first hook is triggered in at least one selected from the group consisting of the server and the server plug-in application prior to generating the HTTP response and the second hook is triggered in at least one selected from the group consisting of the server and the server plug-in after generating the HTTP response.

11. The system of claim 10, wherein the information about the HTTP request and the information about the HTTP response further comprises one selected from the group consisting of data contained in the HTTP request, data contained in the HTTP response, properties of a dynamic component invoked by the server to process the HTTP request, data contained in a cookie associated with the HTTP request, data contained in a cookie associated with the HTTP response, and combinations thereof.

12. The system of claim 11, further comprising an integrated development environment which starts the server in a separate process.

13. The system of claim 12, wherein the graphical display is accessible from within the integrated development environment.

14. The system of claim 12, wherein the client is accessible from within the integrated development environment.

15. The system of claim 12, wherein the integrated development environment comprises a mechanism that listens for requests from external processes and updates the graphical display in response to a notification from the data collector.

16. The system of claim 11, further comprising a directory for storing the information about the HTTP request and the information about the HTTP response on a per-transaction basis.

17. The system of claim 16, further comprising a mechanism running as part of the client which updates the graphical display with the information about the HTTP request and the information about the HTTP response stored in the directory.

18. A system for test-running and debugging a web application, comprising:

a server which hosts the web application servicing a HTTP request from a client, wherein servicing the HTTP request triggers a first hook and a second hook, wherein each of the first hook and the second hook are embedded in at least one selected from the group consisting of the server and a server plug-in application configured to execute on the server, and wherein servicing the HTTP request comprises processing the HTTP request by the server to generate a HTTP response;

an integrated development environment which starts the server in a separate process;

the client configured to send the HTTP request to the server;

a data collector configured to:

collect information about the HTTP request when the first hook is triggered and to return control to the server once information about the HTTP request has been collected, and collect information about the HTTP response generated by the server in response to the HTTP request when a second hook is triggered and to return control to the server once information about the HTTP response has been collected; and an application that provides a graphical display for displaying the information about the HTTP request and information about the HTTP response, wherein the first hook is triggered in at least one selected from the group consisting of the server and the server plug-in application prior to generating the HTTP response and the second hook is triggered in at least one selected from the group consisting of the server and the server plug-in after generating the HTTP response.

19. The system of claim 18, wherein the information about the HTTP request and information about the HTTP response further comprises one selected from the group consisting of data contained in the HTTP request, data contained in the HTTP response, properties of a dynamic component invoked by the server to process the HTTP request, data contained in a cookie associated with the HTTP request, data contained in a cookie associated with the HTTP response, and combinations thereof.

20. The system of claim 19, wherein the information about the HTTP request further comprises properties of a HTTP session associated with the HTTP request.

21. A method for monitoring data flow in a web application, comprising:

sending a HTTP request to a server hosting the web application, wherein the HTTP request is associated with a transaction;

receiving the HTTP request by the server;

triggering a first hook in the server prior to servicing the HTTP request by the server and after receiving the HTTP request, whereby triggering the first hook transfers control to a data collector, wherein the data collector is configured to collect information about the HTTP request when the first hook is triggered and to return control to the server once information about the HTTP request has been collected;

servicing the HTTP request by the server to generate a HTTP response after control is returned to the server;

triggering a second hook in the server after the HTTP response has been generated, whereby triggering the second hook transfers control to a data collector, wherein the data collector is configured to collect information about the HTTP response when the second hook is triggered and to return control to the server once information about the HTTP response has been collected; and forwarding the HTTP response to a client that sent the HTTP request after control is returned to the server, wherein each of the first hook and the second hook are embedded in at least one selected from the group consisting of the server and a server plug-in application configured to execute on the server, wherein the server is configured to process the HTTP request to generate the HTTP response, and wherein the first hook is triggered in at least one selected from the group consisting of the server and the server plug-in application prior to generating the HTTP response and the second hook is triggered in at least one selected from the group consisting of the server and the server plug-in after generating the HTTP response.

22. The method of claim 21, wherein the collected data further comprises one selected from the group consisting of data contained in the HTTP request, data contained in the HTTP response, properties of a dynamic component invoked by the server to process the HTTP request, data contained in a cookie associated with the HTTP request, data contained in a cookie associated with the HTTP response, and combinations thereof.

23. The method of claim 22, wherein the collected data further comprises properties of a HTTP session associated with the HTTP request.

24. The method of claim 21, wherein the HTTP request is intercepted prior to the server making any modifications to the HTTP request.

25. The method of claim 24, wherein the HTTP response is intercepted prior to the server making any modifications to the HTTP response.

* * * * *

UNITED STATES PATENT AND TRADEMARK OFFICE
CERTIFICATE OF CORRECTION

| | |
|---|---|
| PATENT NO. | : 7,016,953 B2 |
| APPLICATION NO. | : 09/730686 |
| DATED | : March 21, 2006 |
| INVENTOR(S) | : Ana H. Von Klopp |

It is certified that error appears in the above-identified patent and that said Letters Patent is hereby corrected as shown below:

<u>Column 14,</u>
Line 45, replace "HIP" with -- HTTP --.

Signed and Sealed this

Twenty-seventh Day of June, 2006

JON W. DUDAS
*Director of the United States Patent and Trademark Office*